(12) United States Patent
Selan et al.

(10) Patent No.: US 8,612,485 B2
(45) Date of Patent: Dec. 17, 2013

(54) DEFERRED 3-D SCENEGRAPH PROCESSING

(75) Inventors: Jeremy Selan, Culver City, CA (US);
Steve LaVietes, Culver City, CA (US);
Brian Hall, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 177 days.

(21) Appl. No.: 12/539,528

(22) Filed: Aug. 11, 2009

(65) Prior Publication Data

US 2010/0042614 A1 Feb. 18, 2010

Related U.S. Application Data

(60) Provisional application No. 61/087,939, filed on Aug. 11, 2008.

(51) Int. Cl.
*G06F 7/00* (2006.01)
*G06F 17/30* (2006.01)

(52) U.S. Cl.
USPC .......................................... 707/796; 709/219

(58) Field of Classification Search
None
See application file for complete search history.

(56) References Cited

U.S. PATENT DOCUMENTS

| | | | | |
|---|---|---|---|---|
| 5,430,870 A * | 7/1995 | Stanton et al. | | 1/1 |
| 5,873,081 A * | 2/1999 | Harel | | 1/1 |
| 5,896,139 A * | 4/1999 | Strauss | | 345/440 |
| 6,215,495 B1 * | 4/2001 | Grantham et al. | | 345/419 |
| 6,243,856 B1 * | 6/2001 | Meyer et al. | | 717/146 |
| 6,262,734 B1 * | 7/2001 | Ishikawa | | 715/850 |
| 6,263,339 B1 * | 7/2001 | Hirsch | | 1/1 |
| 6,263,496 B1 * | 7/2001 | Meyer et al. | | 717/114 |
| 6,301,579 B1 * | 10/2001 | Becker | | 1/1 |
| 6,326,964 B1 * | 12/2001 | Snyder et al. | | 345/419 |
| 6,483,508 B1 * | 11/2002 | Ishikawa | | 345/420 |
| 6,552,721 B1 * | 4/2003 | Ishikawa | | 345/418 |
| 6,570,564 B1 * | 5/2003 | Sowizral et al. | | 345/420 |
| 6,626,954 B1 * | 9/2003 | Kamachi et al. | | 715/236 |
| 6,631,403 B1 * | 10/2003 | Deutsch et al. | | 709/217 |
| 6,751,655 B1 * | 6/2004 | Deutsch et al. | | 709/219 |
| 6,765,571 B2 * | 7/2004 | Sowizral et al. | | 345/420 |
| 6,915,301 B2 * | 7/2005 | Hirsch | | 717/100 |
| 6,919,891 B2 * | 7/2005 | Schneider et al. | | 345/440 |
| 6,980,935 B2 * | 12/2005 | Lu et al. | | 703/1 |
| 7,290,216 B1 * | 10/2007 | Kawahara et al. | | 715/762 |
| 7,432,925 B2 | 10/2008 | D'Amora | | |
| 7,444,595 B2 | 10/2008 | Fournie | | |
| 2002/0059293 A1 * | 5/2002 | Hirsch | | 707/103 R |

(Continued)

OTHER PUBLICATIONS

The render Graph: A data structure to aid in the interactive display of scene graph data, Hofman et al, Jan. 31, 2003.*

(Continued)

*Primary Examiner* — Augustine K Obisesan
(74) *Attorney, Agent, or Firm* — Procopio, Cory, Hargreaves & Savitch, LLP

(57) ABSTRACT

Processing a scenegraph for a client, including: creating a stack of filters, wherein each filter of the stack of filters is configured to edit or create a property on an object within the scenegraph; presenting a query by the client to the stack of filters for a first property on a first object within the scenegraph to determine whether a filter of the stack of filters edits or creates the first property on the first object; and returning a value for the first property if the filter of the stack of filters edits or creates the first property.

16 Claims, 14 Drawing Sheets

(56) References Cited

U.S. PATENT DOCUMENTS

| | | | |
|---|---|---|---|
| 2003/0025692 A1* | 2/2003 | Lu et al. | 345/418 |
| 2003/0025693 A1* | 2/2003 | Haley | 345/418 |
| 2003/0065668 A1* | 4/2003 | Sowizral et al. | 707/100 |
| 2003/0132937 A1* | 7/2003 | Schneider et al. | 345/473 |
| 2003/0172366 A1* | 9/2003 | Rhee et al. | 717/100 |
| 2004/0125114 A1* | 7/2004 | Schmidt et al. | 345/629 |
| 2004/0128070 A1* | 7/2004 | Schmidt et al. | 701/211 |
| 2004/0139080 A1* | 7/2004 | Schmidt et al. | 707/100 |
| 2004/0189667 A1* | 9/2004 | Beda et al. | 345/619 |
| 2004/0189669 A1* | 9/2004 | David et al. | 345/619 |
| 2005/0062678 A1* | 3/2005 | Mark et al. | 345/2.1 |
| 2005/0179703 A1* | 8/2005 | Johnson | 345/632 |
| 2005/0182844 A1* | 8/2005 | Johnson et al. | 709/230 |
| 2005/0234946 A1* | 10/2005 | Woo et al. | 707/100 |
| 2007/0035543 A1* | 2/2007 | David et al. | 345/420 |
| 2007/0211065 A1* | 9/2007 | Feth et al. | 345/522 |
| 2008/0129819 A1* | 6/2008 | Mark et al. | 348/51 |
| 2008/0136817 A1* | 6/2008 | Dederichs et al. | 345/426 |
| 2008/0278482 A1* | 11/2008 | Farmanbar et al. | 345/419 |

OTHER PUBLICATIONS

Extending the scene graph with a dataflow visualization system, Kalkusch et al, VRST, Nov. 1-3, 2006.*

A rendering architecture, Rick LaMont, 2005.*

Flexible parametrization of scene graphs, Reitmayr et al., Proceeding of the IEEE Virtual Reality 2005 (VR'05).*

Visual Information Seeking: Tight Coupling of Dynamic Query Filters with Starfield Displays, Ahlberg et al, Human Factors in Computing Systems, 1994.*

A Generalized Scene Graph, Jürgen Döllner and Klaus Hinrichs, Institut für Informatik, Universität Münster.

* cited by examiner

MATERIAL

| Object | Material | Shadows | Lightlink |

▽ lightShader    ▽ lgt_thc_general_spot_v16    VP

▽ Global

[D]   Exposure  0

[D]   Intensity  1

▷   Color  1.0  0.76087  0.33696

[D] Use_Outer_Color  0

[D]▷  Color_Outer  1.0  1.0  1.0

[D]   Type  spot

⊘ ▷ Distance Falloff

⊘ ▽ Spot Shaping

Cone_Inner_Angle  60

Cone_Outer_Angle  65

[D] Cone_Falloff_Exp  1

[D] Parallel_Rays_On  0

⊘ ▷ Decay_Regions

⊘ ▷ Barndoors

⊘ ▷ Slide Mapping

▷ Noise

▷ SubSurface Scattering

▷ Blockers

▷ Shadows

▷ Cubic Shadows

▷ Ambient Occlusion

FIG. 14B

DEFERRED 3-D SCENEGRAPH PROCESSING

CROSS-REFERENCE TO RELATED APPLICATIONS

This application claims the benefit of priority under 35 U.S.C. §119(e) of U.S. Provisional Patent Application No. 61/087,939, filed Aug. 11, 2008, entitled "Deferred 3-D Scenegraph Processing Model." The disclosure of the above-referenced application is incorporated herein by reference.

BACKGROUND

1. Field of the Invention

The present invention relates to motion picture, and more specifically, to rendering a 3-D scene geometry to a 2-D image representation for a motion picture.

2. Background

Scenegraphs are structured hierarchies of data that contain all information necessary to render a 3-D scene. For example, a common method of using scenegraphs includes representing coordinate transformations at intermediate locations in a tree, with a renderable geometry at leaf locations of the tree. Computer graphics packages typically use some versions of a scenegraph representation. For example, a computer graphics package may include a static scenegraph representation that an artist directly edits to build up the desired result. A more procedural approach to scenegraph construction can be found in other computer graphics packages where blocks of data (such as point lists) can be manipulated by nodes.

Traditional 3-D software packages require a complete scenegraph description to be loaded into memory to be manipulated or processed. Modifications to the scenegraph are either performed directly on the loaded geometry or on additional copies of the geometry in memory. However, when working with scenes of increasing complexity (e.g. New York City), it may not be practical to load the entire scene into memory given the limitations of the memory. Thus, a common method for reducing the memory usage in an interactive session is to segment the scene into workable pieces, load and manipulate only selected pieces at a time, and cache the modified results to files on a disk. These individual geometry caches are then loaded as needed when rendering the 3-D scene geometry to a 2-D image representation. Further, it is common to employ "instancing" (i.e., sharing the underlying data representation amongst multiple identical objects in a scene) to reduce the time spent by an artist to create geometry descriptions and to reduce the memory needed to render the geometry. This technique is primarily used for objects such as trees, grass, or buildings which can be represented as repeated geometry without appearing unduly repetitive. For example, if a building in a city has hundreds of identical windows, an individual window might be created and set up once, and then "instanced" at every window location on the building, which itself might be instanced multiple times in the city. This single window description is cached on a disk and referenced in higher-level scene descriptions of the building and city. The tradeoff with these methods is that it becomes increasingly difficult to manage these individual scene building blocks. For example, to implement an artistic decision to modify a single window using the traditional methods described above, it is necessary to first create a duplicate geometry cache for the modified window and to then update any references to the window in multiple hierarchical layers of the scene description. It is also potentially wasteful to duplicate the full description of an object when only a single property needs to change, such as its color.

SUMMARY

Embodiments of the present invention are used to process a scenegraph describing a 3-D scene for a client.

In one implementation, a method of processing a scenegraph for a client is disclosed. The method including: creating a stack of filters, wherein each filter of the stack of filters is configured to edit or create a property on an object within the scenegraph; presenting a query by the client to the stack of filters for a first property on a first object within the scenegraph to determine whether a filter of the stack of filters edits or creates the first property on the first object; and returning a value for the first property if the filter of the stack of filters edits or creates the first property.

In another implementation, a deferred scenegraph processing system for processing a scenegraph describing a 3-D scene for a client is disclosed. The system including: a scene load filter configured to load a property on an object when the client requests to load the property; a stack of object filters, wherein each object filter of the stack of object filters is configured to edit or create a property on an object within the scenegraph; and a processor configured to receive a query from the client for a first property on a first object within the scenegraph, wherein the query is configured to determine whether a filter of the stack of filters edits or creates the first property on the first object, and wherein a value is returned for the first property if the filter of the stack of filters edits or creates the first property.

In yet another implementation, a computer-readable storage medium storing a computer program for processing a scenegraph for a client is disclosed. The computer program including executable instructions that cause a computer to: create a stack of filters, wherein each filter of the stack of filters is configured to edit or create a property on an object within the scenegraph; present a query by the client to the stack of filters for a first property on a first object within the scenegraph to determine whether a filter of the stack of filters edits or creates the first property on the first object; and return a value for the first property if the filter of the stack of filters edits or creates the first property.

Other features and advantages of the present invention will become more readily apparent to those of ordinary skill in the art after reviewing the following detailed description and accompanying drawings.

BRIEF DESCRIPTION OF THE DRAWINGS

FIG. 14B shows a specialized parameter window to define parameter values for materials used in the scene.

DETAILED DESCRIPTION

As discussed above, traditional 3-D software packages require a complete scenegraph description to be loaded into memory to be manipulated or processed. Modifications to the scenegraph are either performed directly on the loaded geometry or on additional copies of the geometry in memory. However, it may not be practical to load the entire scene into memory. Thus, a common method for reducing the memory usage in an interactive session is to segment the scene into workable pieces, load and manipulate only selected pieces at a time, and cache the modified results to files on a disk. These individual geometry caches are then loaded as needed when rendering the 3-D scene geometry to a 2-D image representation. Further, it is common to employ "instancing" to reduce the time spent by an artist to create geometry descriptions and to reduce the memory needed to render the geometry. For example, if a building in a city has hundreds of identical windows, an individual window might be created and set up once, and then "instanced" at every window location on the building, which itself might be instanced multiple times in the city. This single window description is cached on a disk and referenced in higher-level scene descriptions of the building and city.

Figure 1:
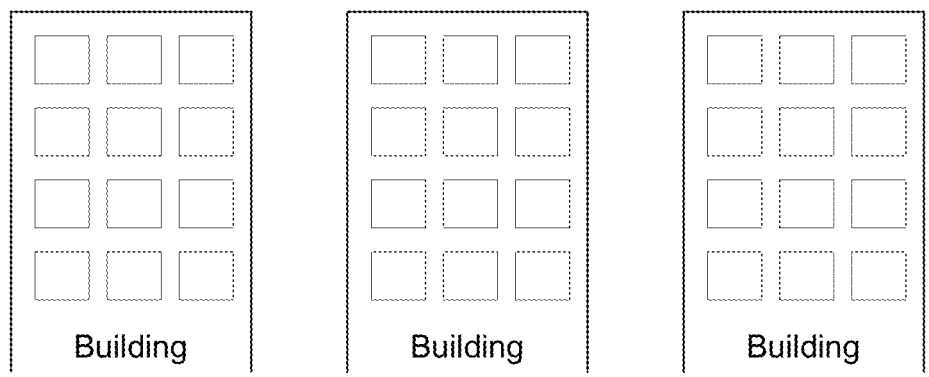
FIG. 1 shows one simple example of a city with three identical rectangular buildings, each building having 12 identical square windows.
Figure 2:
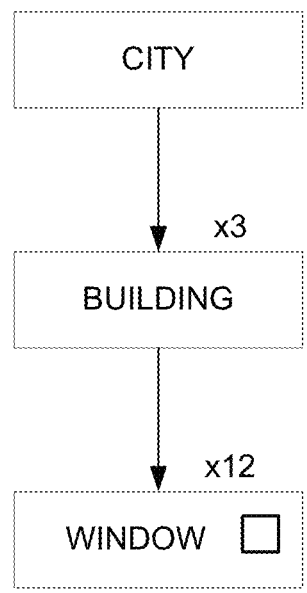
FIG. 2 shows a description of a scenegraph using instanced geometry for the city shown in FIG. 1.

FIG. 1 shows one simple example of a city with three identical rectangular buildings, each building having 12 identical square windows. A description of a scenegraph using instanced geometry for this city is shown in FIG. 2. The scenegraph shows the city being composed of three identical buildings, wherein the description of a building is instanced three times. Further, the scenegraph shows each building composed of 12 identical windows, wherein the description of a square window is instanced 12 times.

Figure 3:
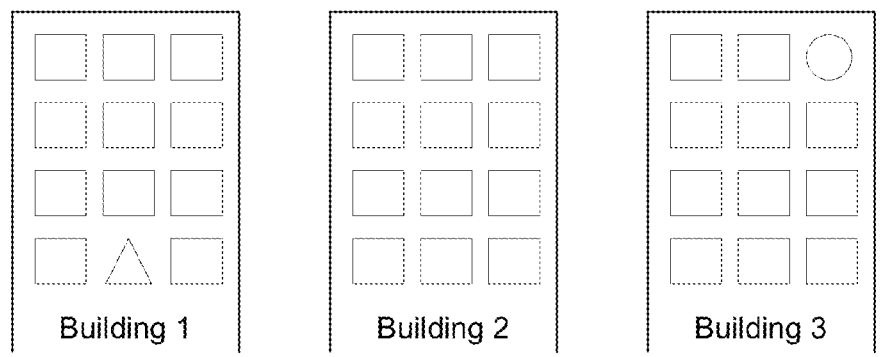
FIG. 3 shows a result of changing two windows that are instanced on three buildings.

FIG. 3 shows a result of changing two windows that are instanced on three buildings. For example, to implement an artistic decision to modify two windows using the traditional approach (one each on two of the three buildings), it is necessary to first create two duplicate geometry caches for the two modified windows and to then update any references to the windows in multiple hierarchical layers of the scene description. In the illustrated example of FIG. 3, the bottom-center window of Building 1 is changed to a triangular window, and the top-right window of Building 3 is changed to a circular window.

Figure 4:
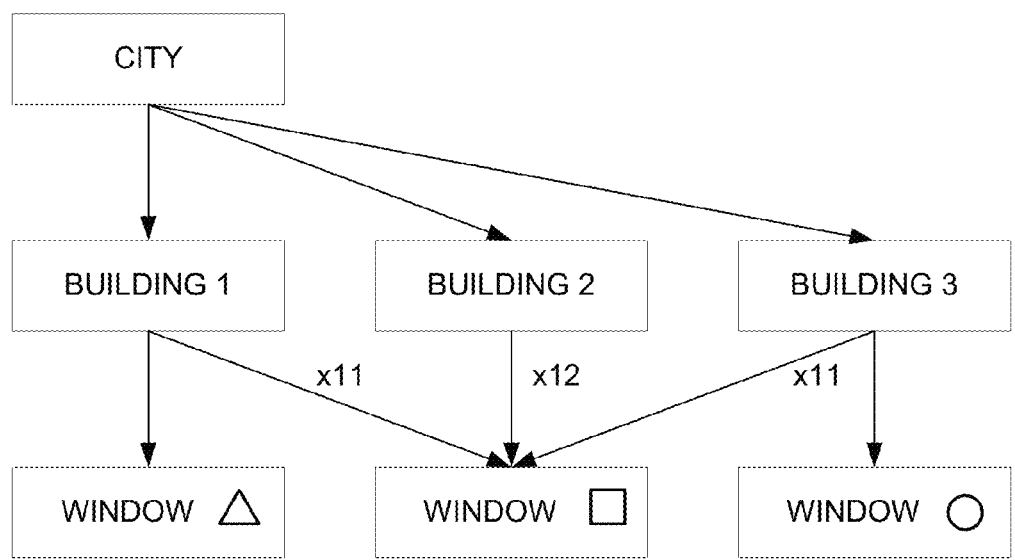
FIG. 4 shows a description of a scenegraph using instanced geometry for the changes to the city shown in FIG. 3.

A description of a scenegraph using instanced geometry for the changes to this city is shown in FIG. 4. The scenegraph shows the city being composed of three buildings, wherein the description of each building is provided as Building 1, Building 2, and Building 3. Further, the scenegraph shows Building 1 composed of 12 windows, wherein the window descriptions include one for a triangular window and another for a square window. The description for the square window is instanced 11 times. The scenegraph also shows Building 2 composed of 12 identical windows, wherein the description of a square window is instanced 12 times. The scenegraph also shows Building 3 composed of 12 windows, wherein the window descriptions include one for a circular window and another for a square window. The description for the square window is instanced 11 times.

Although the example shown in FIGS. 3 and 4 has only three buildings in a city, scenes of a more complex city may involve thousands of changes to various objects sharing references with a deep hierarchy. As described above, to change one window (e.g., from a square window to a triangular window) that is shared as an instance across many buildings, followings tasks have to be performed for every window in the scenegraph: duplicate the window geometry file, make changes to the duplicate file, and adjust the scenegraph so that each window in each building now references the correct geometry file. Therefore, the problem with the traditional approach is that with increasing complexity it becomes increasingly difficult to manage these individual scene building blocks. It is also potentially wasteful to duplicate the full description of an object when only a single property needs to change, such as its shape or color.

To overcome some of the problems described above, certain implementations as disclosed herein provide for methods and systems to implement a particular technique for a computer system to process data for rendering a 3-D scene. One implementation uses a deferred 3-D scenegraph processing model, where results are not computed until the client (e.g., the user/artist or renderer) requests them.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, a deferred scenegraph processing system is configured to facilitate interactive changes to large 3-D scenes. In this system, basic geometric shape descriptions remain as cached files on disks. However, the user does not directly modify these files. Instead, the user creates a series (or a stack) of filters (referred to as object filters) that modify the results to scene queries, without modifying the original scene. A simple example is an object filter that changes the shape of a single window which can be specified either by name or by using a more powerful pattern matching language. When the scene is queried for shape, the object filter returns the modified shape for only the modified window and passes through the original shape for all other unmodified windows.

Figure 5:
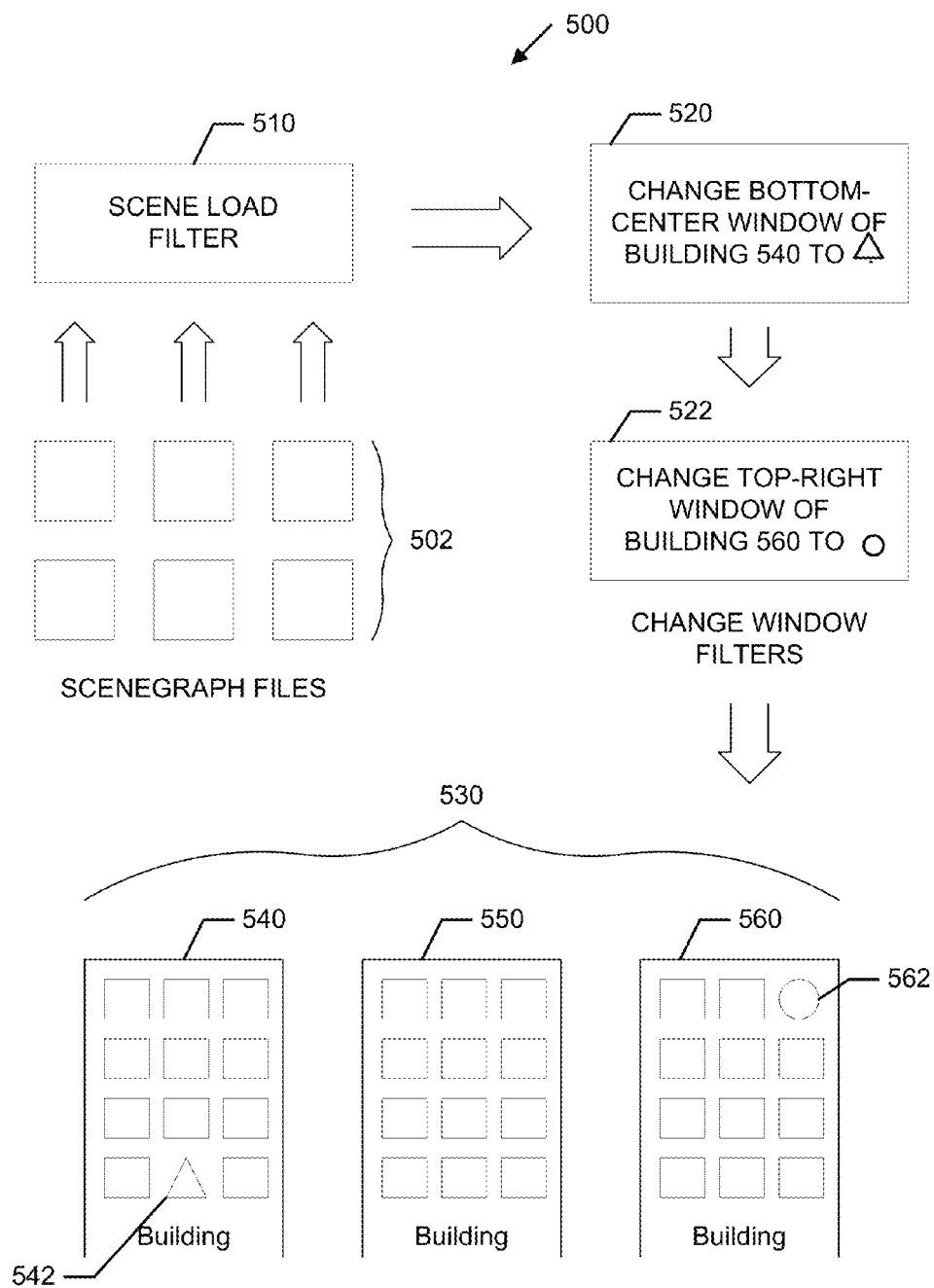
FIG. 5 shows one example of a technique used in a deferred scenegraph processing system in accordance with one implementation of the present invention.

FIG. 5 shows one example 500 of the above-described technique used in the deferred scenegraph processing system in accordance with one implementation of the present invention. As stated above, the technique modifies the results to scene queries by creating a series of object filters rather than modifying the original scene. In contrast to the illustrated example of FIG. 4 to achieve the result shown in FIG. 3, the technique shown in FIG. 5 uses a scene load filter and two simple object filters 520, 522 to achieve the same result 530.

In the illustrated implementation of FIG. 5, full original scenegraph data describing the unmodified city exists as files 502 on a disk. A "scene load" filter 510 loads individual file(s) of the scenegraph data as requested rather than all at once. A client makes a series of queries to determine if there are any modifications to be made to objects in the scene. For example, in FIG. 5, for each property (e.g., a shape) and for each object (e.g., a window), a client queries the object filter 520 to determine whether the object filter 520 is used to edit or create the property. When the query is made as to the shape of the bottom-center window 542 of building 540, the answer is returned in the affirmative and the object filter 520 returns the shape of the bottom-center window 542 of building 540 as a triangular window. Again, when the query reaches the shape for the top-right window 562 of building 560, the object filter 522 returns an affirmative answer indicating that the shape of the top-right window 562 of building 560 is being changed to a circular window. That is, the object filter 522 returns the shape of the top-right window 562 of building 560 as a circular window. No changes are made to other windows of buildings 540, 560, and all windows of building 550. Therefore, the shape of the other windows are returned as square. Thus, in this system, basic geometric shape descriptions remain as cached files on disks but the series of object filters 520, 522 defines the modification made to the answers of scene queries, without modifying the original scene. Other more complicated object filters can change the hierarchy of the scene as queried (by adding, removing, merging objects), use the results of one object in a scenegraph to modify another, or procedurally assign variations to multiple scenegraph objects. Note that all renderable properties are in the scenegraph, including materials, shaders, and global settings. Thus, the filter stack is able to manipulate these as well.

The above-described implementation based on these filtering principles is made possible by relying on a deferred scenegraph processing model, in which scenegraph objects are only loaded on demand. In an interactive processing session, the artist creates, loads, and modifies only the object filters, not the scenegraph itself. During the process of creating and modifying object filters, it may be necessary for the artist to view the properties of specific scenegraph objects. To do this, the artist simply directs the deferred scenegraph processing system to progressively load and cache in memory the filtered results of the objects of interest. Once the artist is done with specific objects, it is just as simple to instruct the system to unload those objects, releasing the memory used by them. Any object filters created or modified by the artist during this interactive process are stored in memory (and eventually to a disk) as a "lightweight" description of the instructions necessary to build the scenegraph.

As this "lightweight" description of the object filters is all that is necessary to interact with the scene in an interactive processing session, this same filter description is all that is needed to render the 3-D scene to a 2-D image. That is, rather than caching the full scene details to the disk before rendering, this series of object filters runs as a plug-in within a renderer. As it is possible in the interactive processing session to load only the scene geometry needed for the given operation, the renderer requests details of the scene objects based on their spatial bounds, loading only that which is necessary to complete the render. Thus, the scene geometry is kept in the memory only as long as needed.

Figure 6:
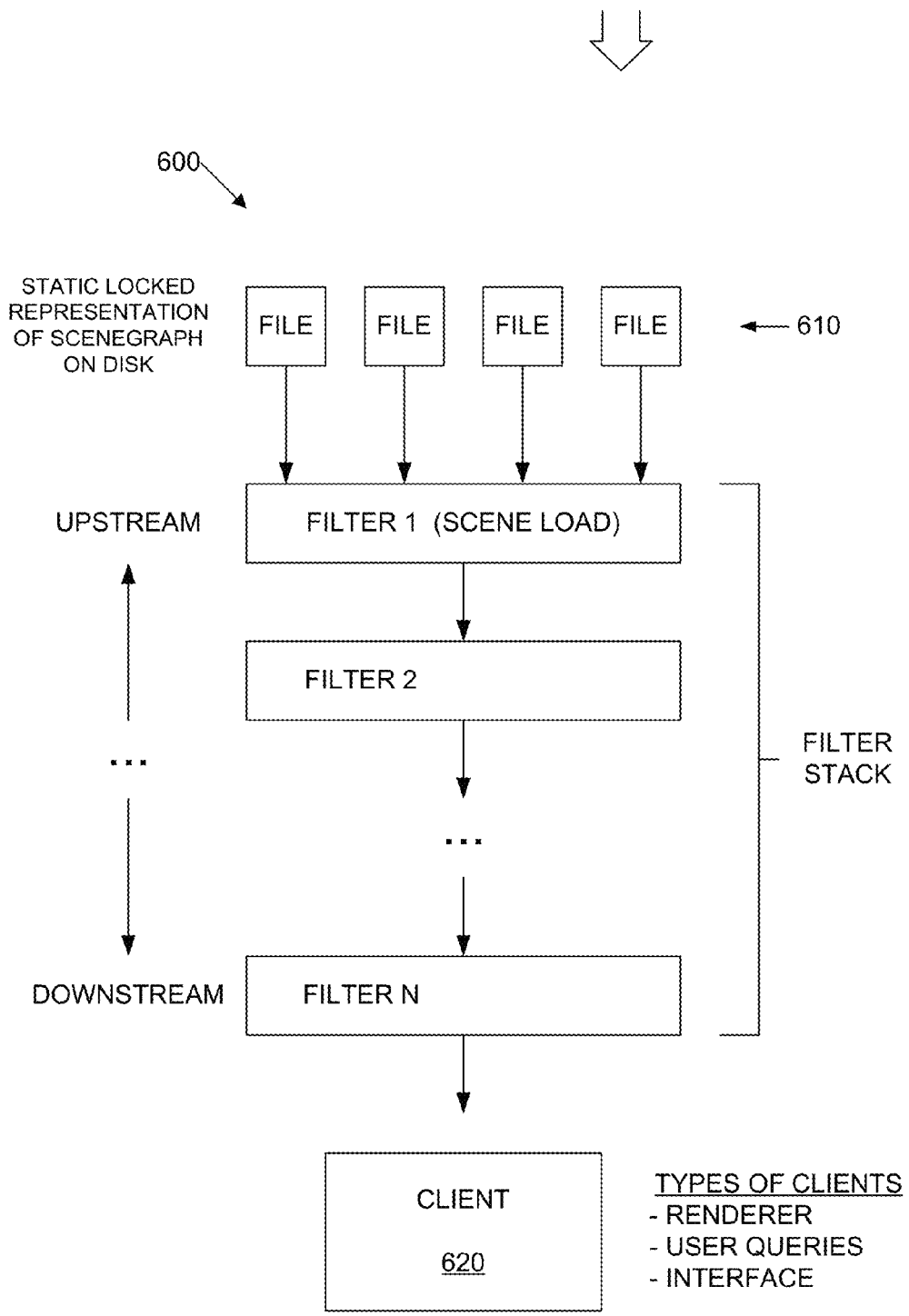
FIG. 6 is a general representation of the example described in FIG. 5.

FIG. 6 is a general representation of the example described in FIG. 5. As stated above, the full scenegraph data exists as files 610 on a disk, which is in a static locked representation (i.e., a "heavy-weight" disk representation). The term "heavy-weight" refers to a representation which consists of a large amount of data. The relevant scenegraph properties are only loaded when queried on demand by a client 620 (e.g., the renderer, user queries, or interface). FIG. 6 further shows a typical structure of a filter stack (i.e., a "light-weight" representation) including a "scene load" filter (Filter 1) and a series of object filters (Filter 2 through Filter N). The term "light-weight" refers to a representation which consists of a small amount of data. All scenegraph queries are routed through the light-weight stack of filters. If a scene property is not changed or created by a downstream filter in the stack, the client queries the next upstream filter until the client query is percolated back to the locked disk representation. However, if a filter does need to apply a client edit or creation to a scene property, the filter directly returns the new property to the client.

Figure 7:
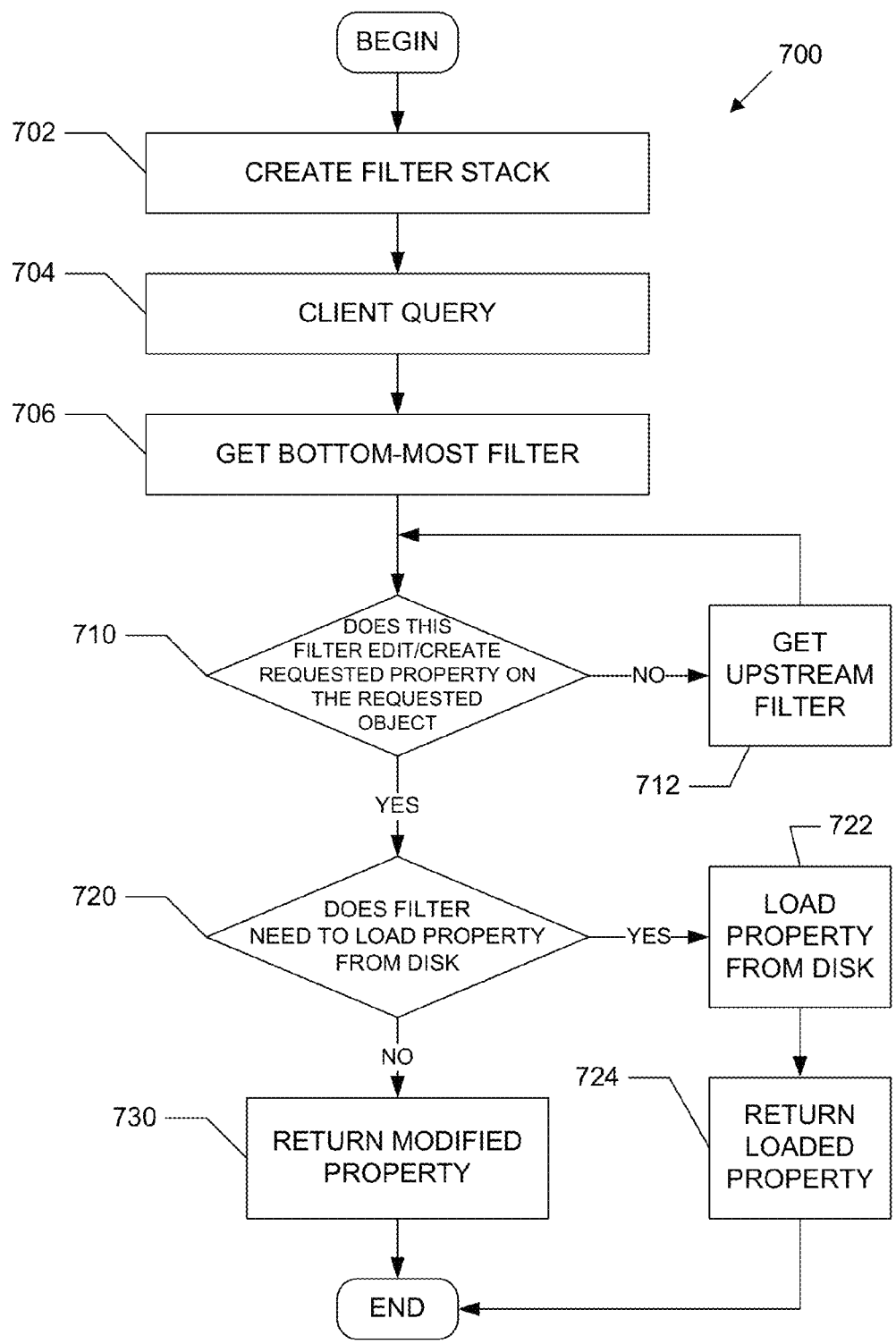
FIG. 7 is a flowchart illustrating a technique of how a filter stack responds to scenegraph queries, which is used in the deferred scenegraph processing system, in accordance with one implementation of the present invention.

FIG. 7 is a flowchart 700 illustrating a technique of how a filter stack responds to scenegraph queries, which is used in the deferred scenegraph processing system, in accordance with one implementation of the present invention. In the illustrated implementation of FIG. 7, a "light-weight" representation filter stack is created, at box 702. A client then makes a query, at box 704, for a specified scene property on a specified scene object. The query is started by retrieving a bottom-most filter in the filter stack, at box 706. If it is determined, at box 710, that the retrieved filter does not edit or create the requested property on the requested object, a next upstream filter is retrieved, at box 712, for the next query. Otherwise, if it is determined, at box 710, that the retrieved filter does edit or create the requested property on the requested object, the technique moves to box 720 to determine if the filter needs to load the requested property from the disk. If it is determined that the filter needs to load the requested property, the property is loaded from the disk, at box 722, and the loaded property is returned, at box 724. Otherwise, if it is determined that the filter does not need to load the requested property, the requested property is modified by the filter and the modified property is returned, at box 730.

Figure 8:
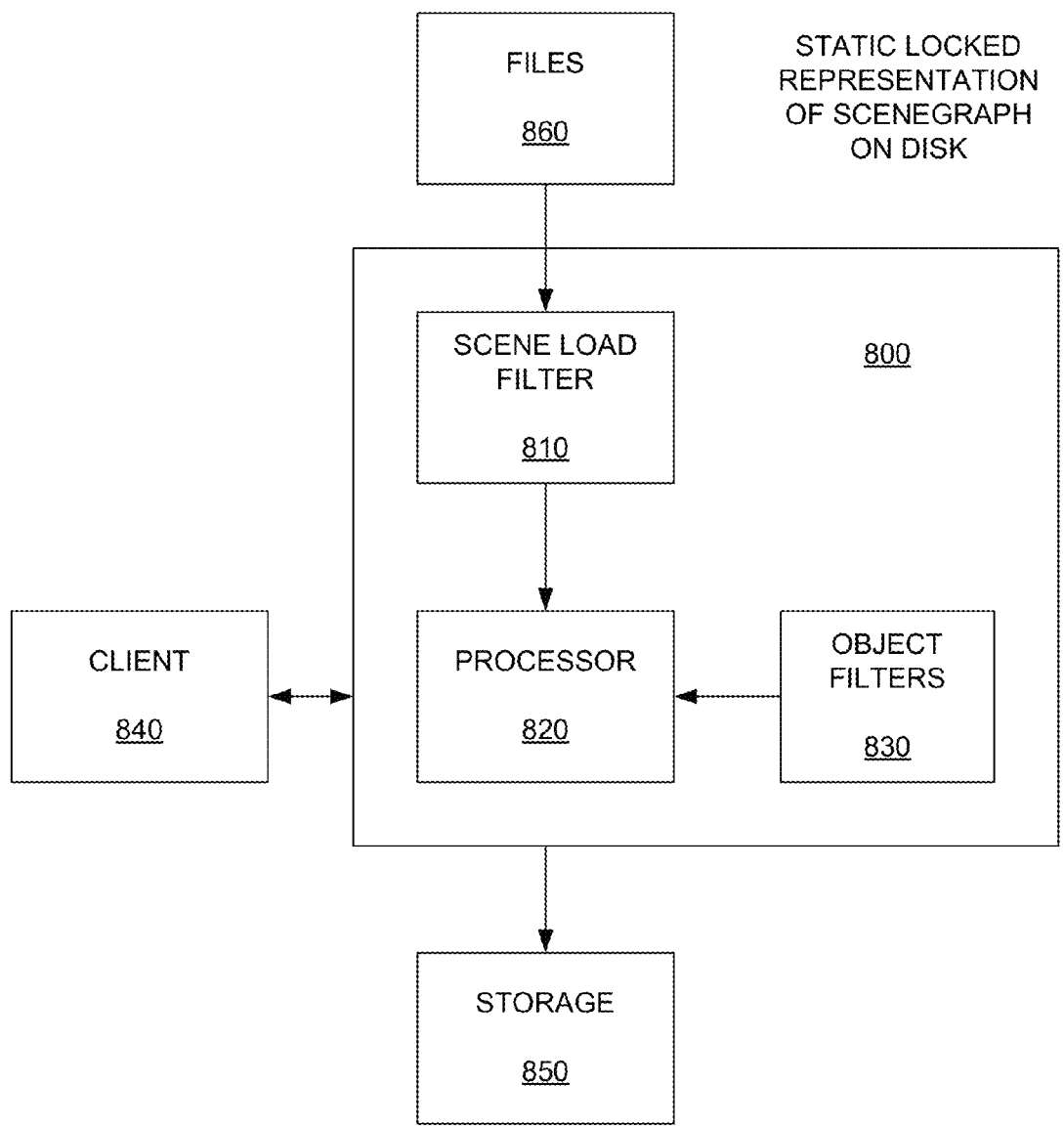
FIG. 8 is a block diagram of the deferred scenegraph processing system.

FIG. 8 is a block diagram of a deferred scenegraph processing system 800, which includes a scene load filter 810, a stack of object filters 830, and a processor 820. The full scenegraph data exists as files 860 on a disk, which is in a static locked representation (i.e., a "heavy-weight" disk representation). The scene load filter 810 loads the relevant scenegraph properties only when queried on demand by a client 840.

The processor 820 creates a "light-weight" representation filter stack 830, and performs scenegraph queries which are routed through the filters 830. If a scene property is not changed or created by a downstream filter in the stack 830, the client 840, through the processor 820, queries the next upstream filter until the client query is percolated back to the locked disk representation in the files 860. However, if a filter does need to apply a client edit or creation to a scene property, the filter directly returns the new property to the client 840. The processor 820 can store the created stack of object filters in storage 850.

Figure 9:
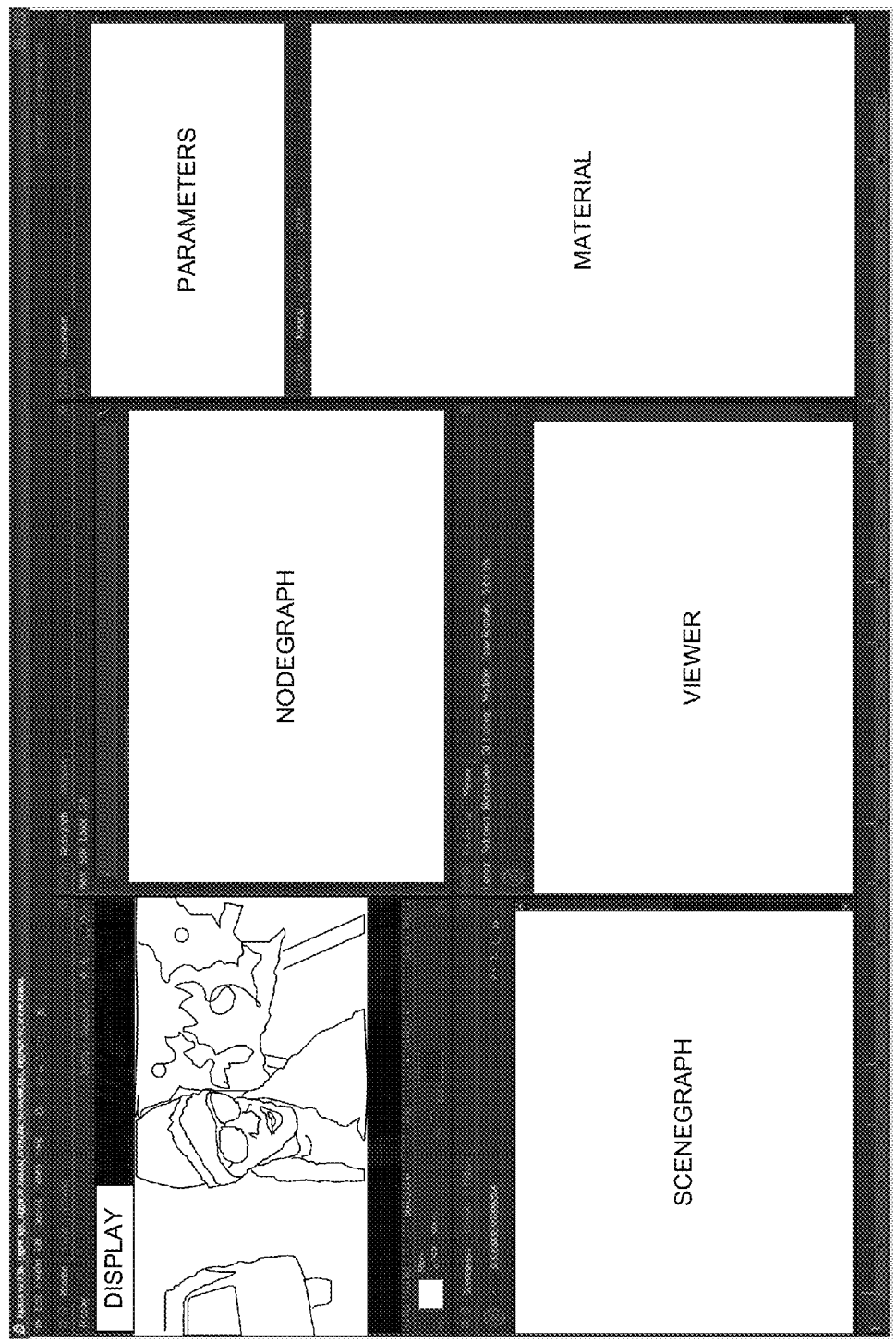
FIG. 9 shows a top-level window having sub-windows including a display sub-window, a nodegraph sub-window, a scenegraph sub-window, a viewer sub-window, a parameters sub-window, and a material sub-window.

FIGS. 9 through 14B show one implementation of a deferred scenegraph processing system configured as an integrated lighting and compositing tool. FIG. 9 shows a top-level window having sub-windows including a display sub-window, a nodegraph sub-window, a scenegraph sub-window, a viewer sub-window, a parameters sub-window, and a material sub-window.

Figure 10:
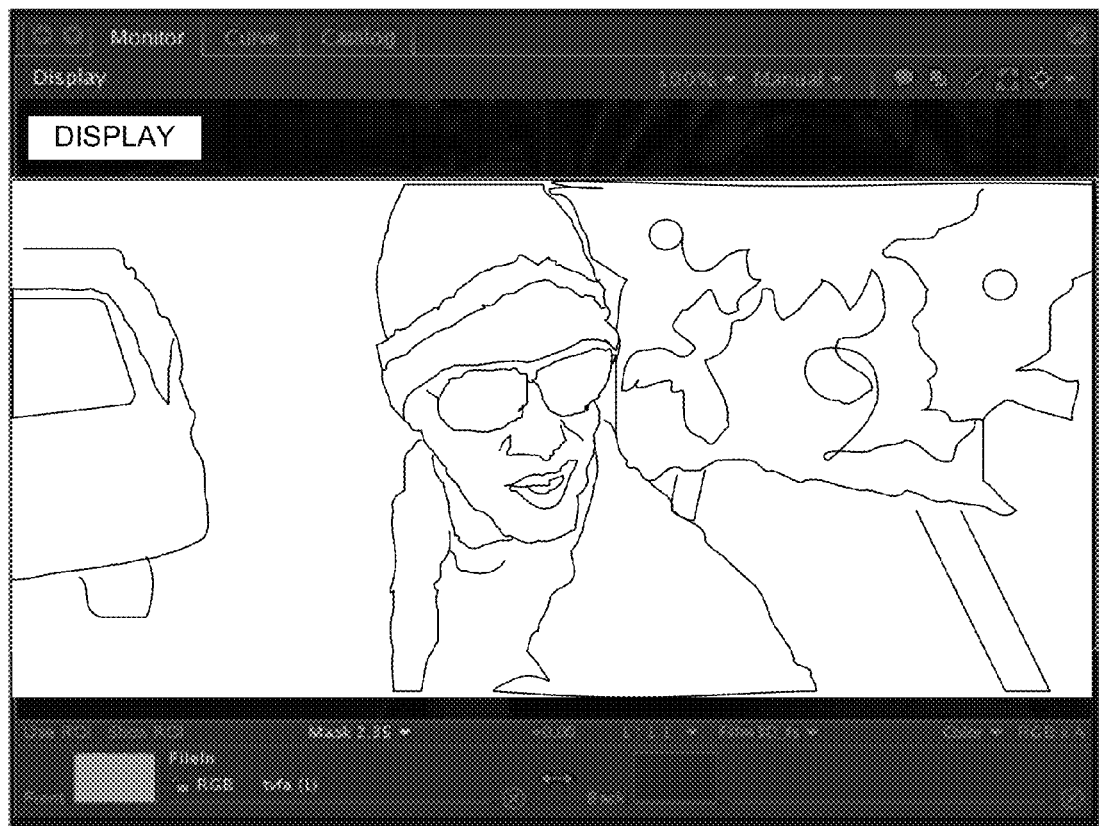
FIG. 10 shows the display sub-window to display a scene of interest.
Figure 11:
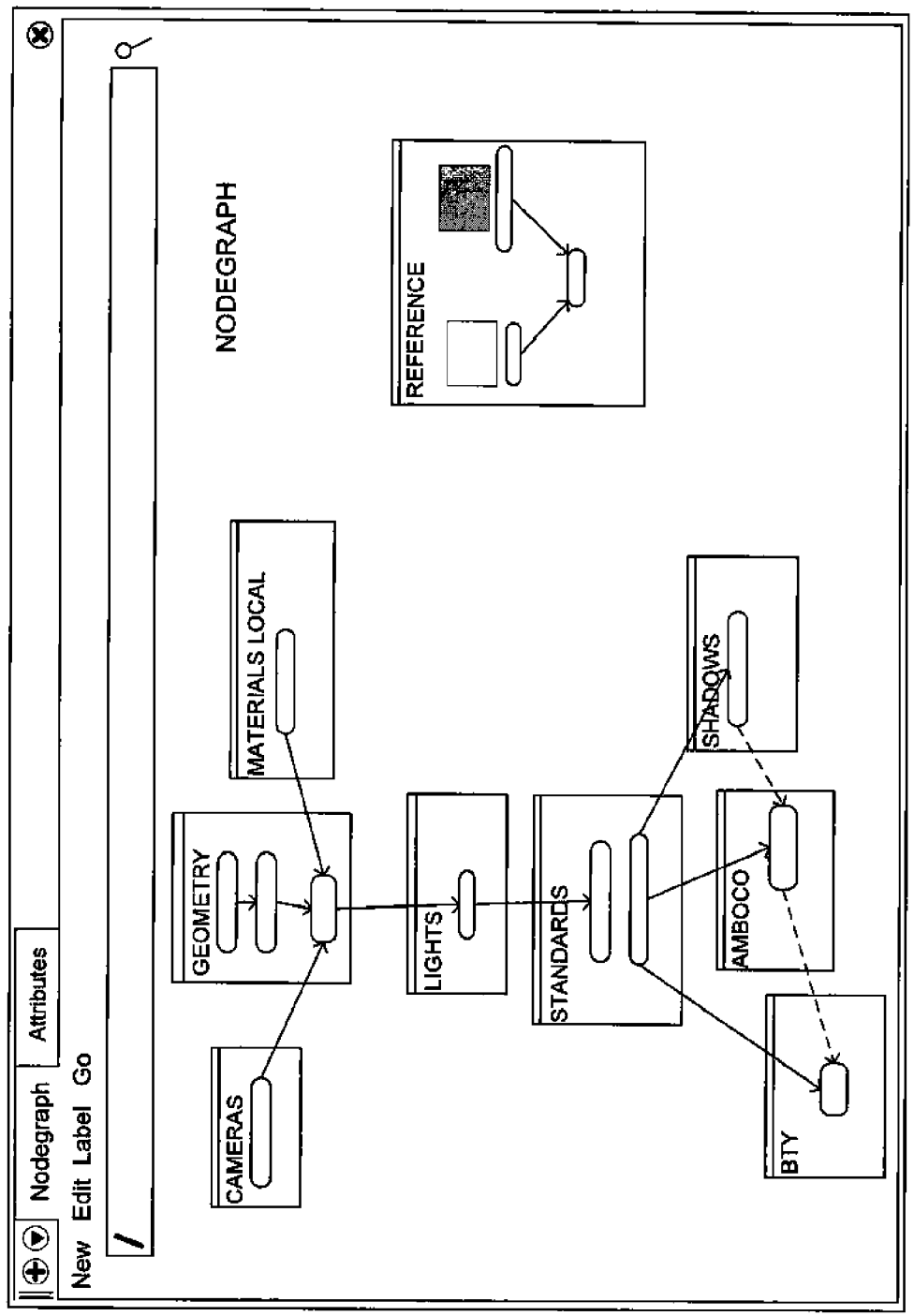
FIG. 11 shows the nodegraph sub-window in detail to show one example of a nodegraph of the scene.
Figure 12:
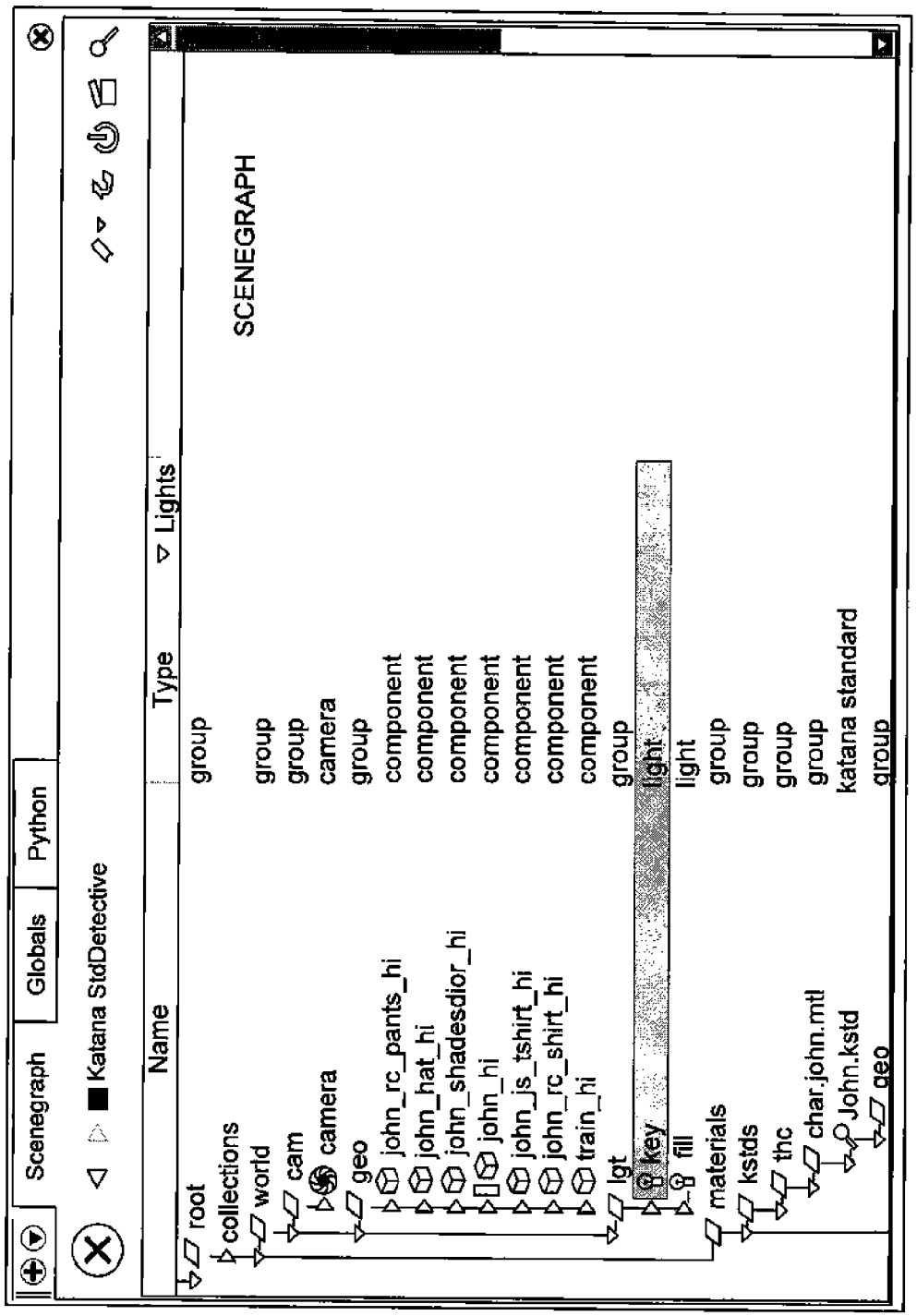
FIG. 12 shows the scenegraph sub-window in detail to show one example of a scenegraph of the scene.
Figure 13:
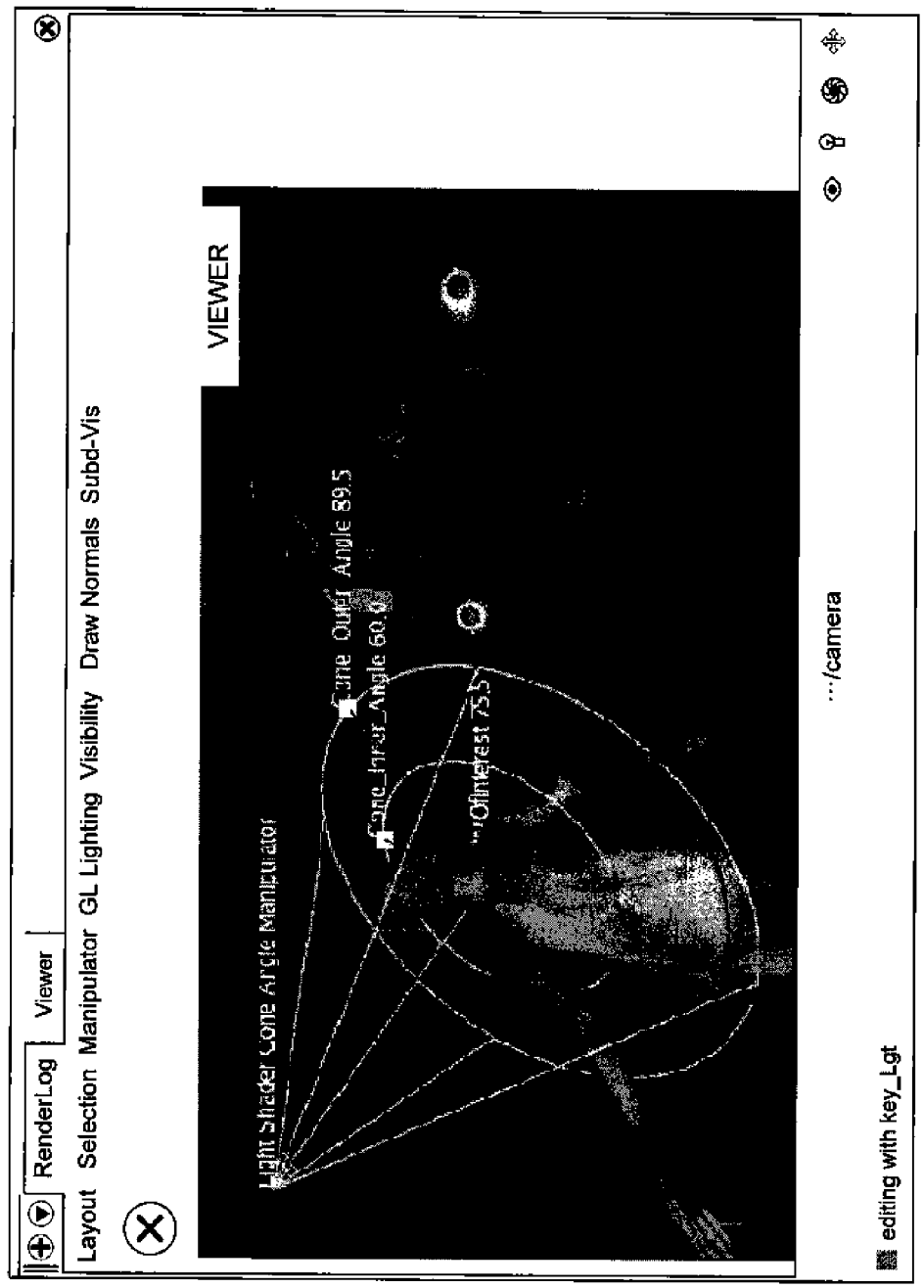
FIG. 13 shows the viewer sub-window in detail to show one example of light and camera angles for the scene.
Figure 14A:
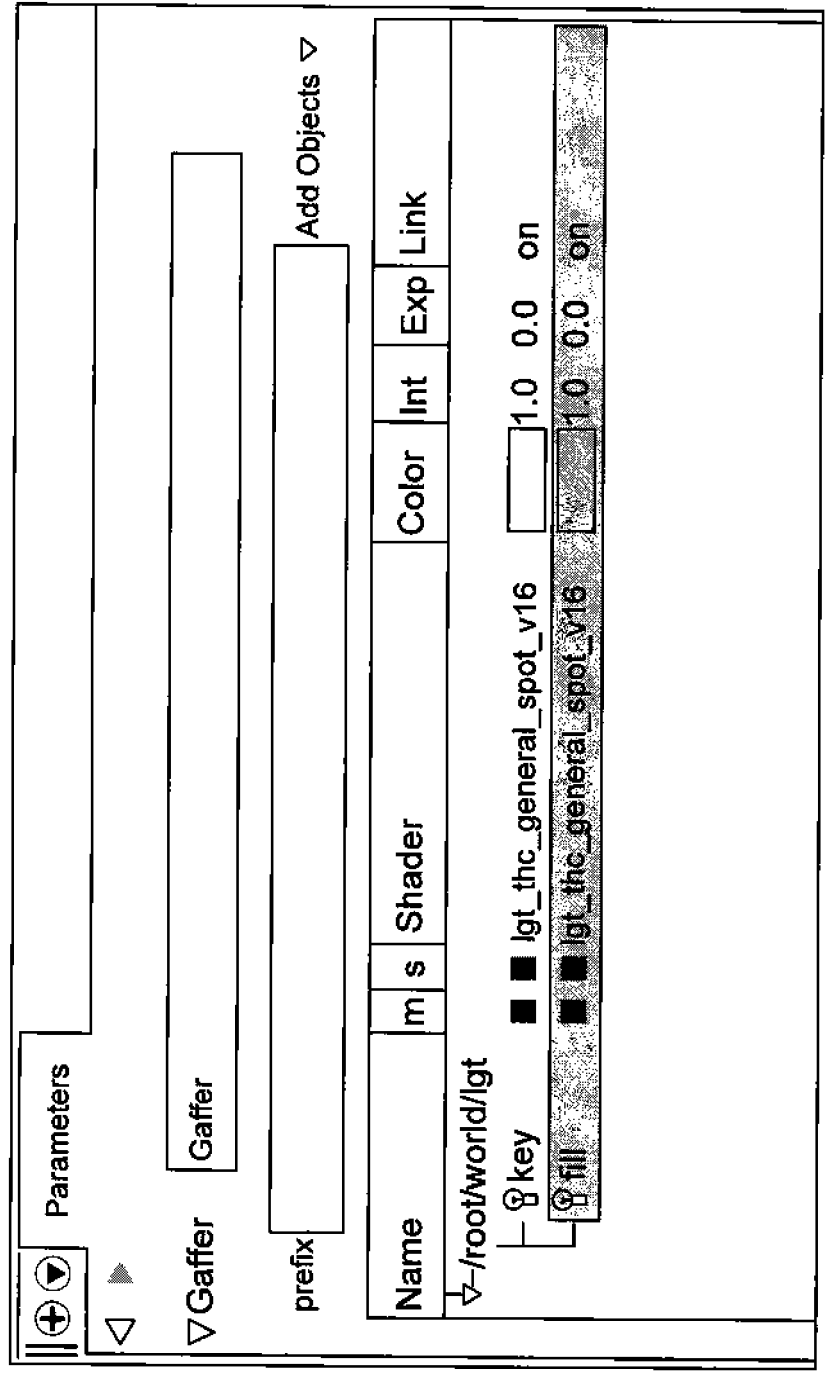
FIG. 14A shows the parameters sub-window to define parameters of nodes in the nodegraph used to create filters.

FIG. 10 shows the display sub-window to display a scene of interest. FIG. 11 shows the nodegraph sub-window in detail to show one example of a nodegraph of the scene. FIG. 12 shows the scenegraph sub-window in detail to show one example of a scenegraph of the scene. FIG. 13 shows the viewer sub-window in detail to show one example of light and camera angles for the scene. FIG. 14A shows the parameters sub-window to define parameters of objects in the scene. FIG. 14B shows the material sub-window to define values for material used in the scene.

Figure 15A:
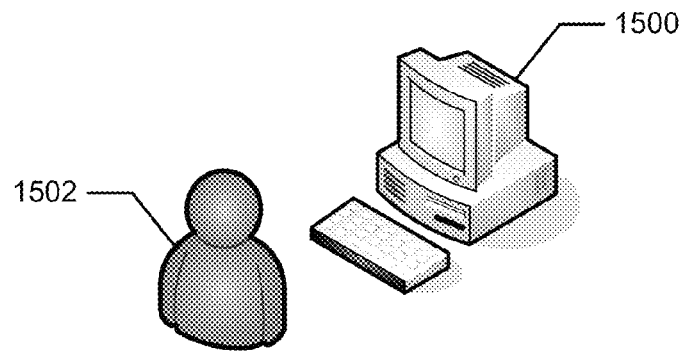
FIG. 15A illustrates a representation of a computer system and a user.

FIG. 15A illustrates a representation of a computer system 1500 and a user 1502. The user 1502 uses the computer system 1500 to perform a deferred scenegraph processing. The computer system 1500 stores and executes a deferred scenegraph processing system 1590.

Figure 15B:
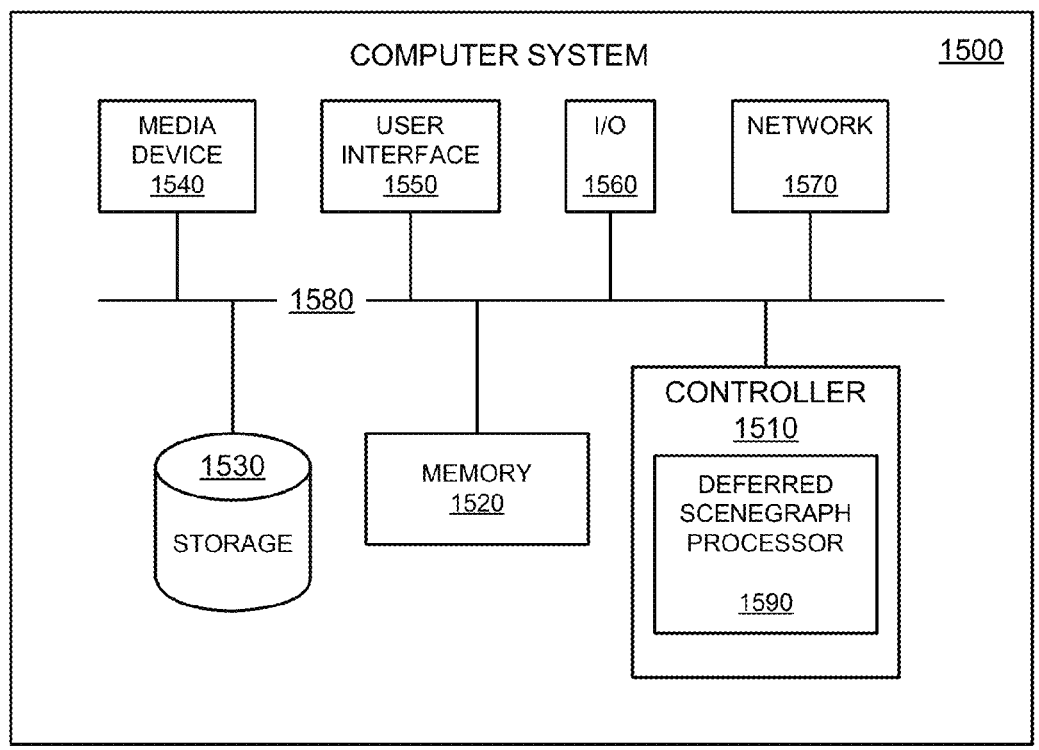
FIG. 15B is a functional block diagram illustrating the computer system hosting the deferred scenegraph processing system.

FIG. 15B is a functional block diagram illustrating the computer system 1500 hosting the deferred scenegraph processing system 1590. The controller 1510 is a programmable processor and controls the operation of the computer system 1500 and its components. The controller 1510 loads instructions (e.g., in the form of a computer program) from the memory 1520 or an embedded controller memory (not shown) and executes these instructions to control the system. In its execution, the controller 1510 provides the deferred scenegraph processing system 1590 as a software system. Alternatively, this service can be implemented as separate hardware components in the controller 1510 or the computer system 1500.

Memory 1520 stores data temporarily for use by the other components of the computer system 1500. In one implementation, memory 1520 is implemented as RAM. In one implementation, memory 1520 also includes long-term or permanent memory, such as flash memory and/or ROM.

Storage 1530 stores data temporarily or long term for use by other components of the computer system 1500, such as for storing data used by the deferred scenegraph processing system 1590. In one implementation, storage 1530 is a hard disk drive.

The media device 1540 receives removable media and reads and/or writes data to the inserted media. In one implementation, for example, the media device 1540 is an optical disc drive.

The user interface 1550 includes components for accepting user input from the user of the computer system 1500 and presenting information to the user. In one implementation, the user interface 1550 includes a keyboard, a mouse, audio speakers, and a display. The controller 1510 uses input from the user to adjust the operation of the computer system 1500.

The I/O interface 1560 includes one or more I/O ports to connect to corresponding I/O devices, such as external storage or supplemental devices (e.g., a printer or a PDA). In one implementation, the ports of the I/O interface 1560 include ports such as: USB ports, PCMCIA ports, serial ports, and/or parallel ports. In another implementation, the I/O interface 1560 includes a wireless interface for communication with external devices wirelessly.

The network interface 1570 includes a wired and/or wireless network connection, such as an RJ-45 or "Wi-Fi" interface (including, but not limited to 802.11) supporting an Ethernet connection.

The computer system 1500 includes additional hardware and software typical of computer systems (e.g., power, cooling, operating system), though these components are not specifically shown in FIG. 15B for simplicity. In other implementations, different configurations of the computer system can be used (e.g., different bus or storage configurations or a multi-processor configuration).

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of The invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A computer-implemented method of deferred scenegraph processing for a client, the method comprising:
generating a stack of filters, wherein each filter of the stack of filters is configured to edit a property on an object within a scene described by the scenegraph;
presenting by the client a query of the stack of filters for a first property on a first object within the scenegraph to determine whether a filter of the stack of filters edits the first property on the first object, including retrieving a bottom-most filter in the stack of filters;
returning a value for the first property if the filter of the stack of filters edits the first property; and
querying the stack of filters for all properties on the first object, and moving on to a next object until all objects in the scenegraph have been queried,
wherein querying the stack of filters for all properties on an object enables the client to create, modify, and only load the stack of filters for scenegraph objects that need editing and not the entire scenegraph, and
wherein the stack of filters is used with the scenegraph to render the scene;
retrieving a next upstream filter if the bottom-most filter does not edit the first property;
returning the value for the first property which is edited if the bottom-most filter does edit the first property, but does not need to load it from a disk; and
loading and returning a loaded value for the first property if the bottom-most filter does edit the first property, and does need to load it from the disk.

2. The method of claim 1, wherein returning a value for the first property comprises
returning an edited value for the first property.

3. The method of claim 1, wherein returning a value for the first property comprises:
loading the first property from a disk; and
returning a loaded value for the first property.

4. The method of claim 1, wherein the scenegraph is configured as files on a disk, and the scenegraph is in a static locked representation.

5. The method of claim 1, wherein the stack of filters is configured as light-weight representations consisting of small amounts of data.

6. The method of claim 1, wherein the client is a renderer.

7. The method of claim 1, wherein the client is a graphical user interface.

8. The method of claim 1, wherein the client is user queries.

9. A deferred scenegraph processing system for processing a scenegraph describing a 3-D scene for a client, the system comprising:
a scene load filter configured to load a property on an object when the client requests to load the property;
a stack of object filters,
wherein each object filter of the stack of object filters is configured to edit a property on an object within a scene described by the scenegraph; and
a processor configured to receive a query from the client for a first property on a first object within the scenegraph,
wherein the query is configured to determine whether a filter of the stack of filters edits the first property on the first object,
wherein a value is returned for the first property if the filter of the stack of filters edits the first property,
wherein the stack of filters is queried for all properties on the first object, and moving on to a next object until all objects in the scenegraph have been queried,
wherein querying of the stack of filters for all properties on an object enables the processor to create, modify, and only load the stack of filters for scenegraph objects that need editing and not the entire scenegraph, and
wherein the stack of filters is used with the scenegraph to render the scene,
the processor operating to: retrieve a bottom-most filter in the stack of filters;
retrieve a next upstream filter if the bottom-most filter does not edit the first property;
return the value for the first property which is edited if the bottom-most filter does edit the first property, but does not need to load it from a disk; and load and return a loaded value for the first property if the bottom-most filter does edit the first property, and does need to load it from the disk.

10. The system of claim 9, wherein the scenegraph is configured as files on a disk, and the scenegraph is in a static locked representation.

11. The system of claim 9, wherein the stack of object filters is configured as light-weight representations consisting of small amounts of data.

12. The system of claim 9, wherein the client is a renderer.

13. A non-transitory computer-readable storage medium storing a computer program for processing a scenegraph for a client, the computer program comprising executable instructions that cause a computer to:
generate a stack of filters,
wherein each filter of the stack of filters is configured to edit a property on an object within a scene described by the scenegraph;
present by the client a query of the stack of filters for a first property on a first object within the scenegraph to determine whether a filter of the stack of filters edits the first property on the first object, including retrieve a bottom-most filter in the stack of filters;
return a value for the first property if the filter of the stack of filters edits the first property; and
query the stack of filters for all properties on the first object, and move on to a next object until all objects in the scenegraph have been queried,
wherein the executable instructions that query the stack of filters for all properties on an object enable the client to create, modify, and only load the stack of filters for scenegraph objects that need editing and not the entire scenegraph, and
wherein the stack of filters is used with the scenegraph to render the scene;
retrieve a next upstream filter if the bottom-most filter does not edit the first property;
return the value for the first property which is edited if the bottom-most filter does edit the first property, but does not need to load it from a disk; and
load and return a loaded value for the first property if the bottom-most filter does edit the first property, and does need to load it from the disk.

14. The storage medium of claim 13, wherein the scenegraph is configured as files on a disk, and the scenegraph is in a static locked representation.

15. The storage medium of claim 13, wherein the stack of filters is configured as light-weight representations consisting of small amounts of data.

16. The storage medium of claim 13, wherein the client is a renderer.

* * * * *